United States Patent
Clingman et al.

(10) Patent No.: US 9,893,578 B2
(45) Date of Patent: Feb. 13, 2018

(54) DOWNHOLE ELECTRIC MOTORS HAVING ANGULARLY DISPLACED ROTOR SECTIONS

(71) Applicant: Baker Hughes Incorporated, Houston, TX (US)

(72) Inventors: James C. Clingman, Broken Arrow, OK (US); Chad A. Craig, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 411 days.

(21) Appl. No.: 14/693,249

(22) Filed: Apr. 22, 2015

(65) Prior Publication Data

US 2016/0315527 A1 Oct. 27, 2016

(51) Int. Cl.
*H02K 1/27* (2006.01)
*H02K 1/28* (2006.01)
*H02K 5/132* (2006.01)

(52) U.S. Cl.
CPC ............. *H02K 1/276* (2013.01); *H02K 5/132* (2013.01); *H02K 2201/06* (2013.01)

(58) Field of Classification Search
CPC ...... H02K 1/276; H02K 1/2753; H02K 1/274; H02K 1/27; H02K 1/28; H02K 5/132; H02K 7/003; H02K 2201/06
USPC .......................... 310/114, 87, 156.08, 156.09
See application file for complete search history.

(56) References Cited

U.S. PATENT DOCUMENTS

| | | | | |
|---|---|---|---|---|
| 6,388,353 B1* | 5/2002 | Liu | ......... | H02K 1/278 310/114 |
| 6,710,491 B2* | 3/2004 | Wu | ......... | H02K 1/2786 310/112 |
| 2011/0037332 A1* | 2/2011 | Neuroth | ......... | H02K 1/28 310/87 |

* cited by examiner

*Primary Examiner* — Michael Andrews
(74) *Attorney, Agent, or Firm* — Law Offices of Mark L. Berrier

(57) ABSTRACT

Systems and methods for constructing electric motors in which rotor sections are individually keyed to a rotor shaft such that, in a resting position, the rotor sections are circumferentially shifted ("clocked") with respect to each to mitigate effects of harmonic feedback, torsional flexibility and the like. In one embodiment, a system includes an electric drive, and an ESP coupled to it by a power cable. The ESP motor has a rotor in which multiple permanent-magnet rotor sections are mounted to a shaft. Within each rotor section, permanent magnets are positioned in two or more axially aligned rows. Adjacent rotor sections are clocked with respect to each other so that, in operation, the rows of permanent magnets in the different rotor sections are positioned to counter the harmonic feedback or to use torsional deflection to equalize torque contributions from the different rotor sections.

20 Claims, 5 Drawing Sheets

DOWNHOLE ELECTRIC MOTORS HAVING ANGULARLY DISPLACED ROTOR SECTIONS

BACKGROUND

Field of the Invention

The invention relates generally to electric motors, and more particularly to systems and methods for construction of elongated electric motors in which the motor shaft can twist and skew the alignment of multiple rotor sections that are coupled to the shaft.

Related Art

Oil and natural gas are often produced by drilling wells into oil reservoirs and then pumping the oil and gas out of the reservoirs through the wells. If there is insufficient pressure in the well to force these fluids out of the well, it may be necessary to use an artificial lift system in order to extract the fluids from the reservoirs. A typical artificial lift system employs an electric submersible pump (ESP) which is positioned in a producing zone of the well to pump the fluids out of the well.

An ESP system includes a pump and a motor which is coupled to the pump and drives the pump to lift fluid out of the well. The ESP system may also include seals, gauge packages and other components. Because they are designed to fit within the borehole of a well, ESP systems are typically less than ten inches wide, but may be tens of meters long. The motor of an electric submersible pump system may produce hundreds of horsepower.

One type of motor that may be used in ESP systems is a permanent-magnet motor. In this type of motor, a long motor shaft extends through several rotor sections that are coupled to the shaft. Each of the rotor sections includes a set of permanent magnets that are typically positioned in multiple (e.g., four) axially aligned rows. The shaft and rotor sections are positioned within a stator. The stator has several coils or windings of wire positioned in a stator core. When the coils are energized, the windings generate magnetic fields that interact with the magnets of the rotor sections. The power provided to the stator windings is controlled to cause the magnetic fields of the stator to drive the rotor sections to rotate within the stator, thereby driving the rotation of the shaft. The rotating shaft is coupled to the ESP's pump and drives the pump to lift fluid out of the well.

There are several problems that may arise in the operation of permanent-magnet motors. Permanent-magnet motors are synchronous, so the rotor is always trying to stay at same rotational speed as the magnetic fields in the stator. The motor may therefore develop harmonic feedback that can be transmitted back to the motor's drive. This feedback may reduce the efficiency of the motor, and may even be harmful to the system. It would therefore be desirable to provide means to cancel out or reduce the harmonic feedback.

In addition to the problem of harmonic feedback, the motor may experience inefficiencies relating to the torsional rigidity (or lack of rigidity) of the motor shaft. Because the motor may be very long, the shaft may have a lower torsional rigidity at the bottom, as compared to the top. Since there is no slip in a permanent magnet motor, this leads to the lower-most rotor sections imparting less torque on the shaft than is provided by rotor sections mounted higher on the shaft. As a result, adding length, and more rotor sections, to a permanent magnet motor may provide diminishing returns with regards to torque output, power output, and efficiency. It would therefore be desirable to provide means to mitigate this problem.

SUMMARY OF THE INVENTION

This disclosure is directed to systems and methods for constructing electric motors that may mitigate or resolve the problems discussed above. In one particular embodiment, each of the rotor sections are individually keyed to the rotor shaft such that, in a resting position, the rotor sections are rotationally shifted ("clocked") with respect to each other. Because the motor is synchronous, when it is operated, the permanent magnets in the rotor sections cause them to twist the rotor shaft, so that the rotor sections move back toward axial alignment. The torsional deflection caused by each successive rotor section enables that rotor section to provide a greater contribution to the overall torque on the shaft. By enabling equivalent torque contributions from each rotor section in the motor, the efficiency and power output of the motor are increased.

One embodiment comprises a system that includes an electric drive, an ESP and a power cable coupled to carry power from the drive to the ESP. The ESP includes a pump and a motor that drives the pump. The motor has a stator and a rotor in which multiple permanent-magnet rotor sections are mounted to a shaft. Within each of the rotor sections, a set of permanent magnets are positioned in two or more rows, where each row is axially aligned. Adjacent ones of the rotor sections are clocked with respect to each other so that the rows of permanent magnets within a first one of the rotor sections are circumferentially displaced from corresponding rows of permanent magnets within a second, adjacent one of the rotor sections. The displacement of the rotor sections may be used to counter harmonic feedback and unequal torque contributions resulting from torsional flexibility of the shaft.

In one embodiment, at least one end of each rotor section is keyed to the rotor shaft to maintain a predetermined displacement angle between the rotor sections. Each rotor section may have a pair of end rings secured to opposing ends of the rotor section to hold a set of rotor laminations and the permanent magnets in position on a rotor tube. The end rings may be keyed to mate with a slot in the rotor shaft to maintain the angular/circumferential position of each rotor section with respect to the shaft and adjacent rotor sections. In one embodiment, each end ring is a one-piece unit that has a slot at a predetermined position, and a key is used to maintain the alignment of the end ring slot with the shaft slot. Alternatively, the end rings may be two-piece units, where an inner ring that has a slot similar to the one-piece unit is rotatable with respect to an outer ring that can be secured to the rotor tube after the inner ring is rotated to orient the slot at a desired position. In some embodiments, the position of the end ring slot on each rotor section is placed at a desired position with respect to the rows of magnets in the rotor, and the rotor section is keyed to a single, common slot in the rotor shaft. Different rotor sections may have the end ring slots different circumferential positions. In other embodiments, the circumferential position of the end ring slot may be the same for each rotor section, but each rotor section may be keyed to a different shaft slot, where the shaft slots have different circumferential positions, resulting in clocking of the rotor sections with respect to each other. The clocking of each rotor section with respect to adjacent sections may be the same for each rotor section, or it may vary between pairs of rotor sections.

Alternative embodiments may include downhole motors as described above, or methods for constructing rotors, downhole motors, or ESP systems. Numerous other embodiments may also be possible.

BRIEF DESCRIPTION OF THE DRAWINGS

Other objects and advantages of the invention may become apparent upon reading the following detailed description and upon reference to the accompanying drawings.

Figure 1:
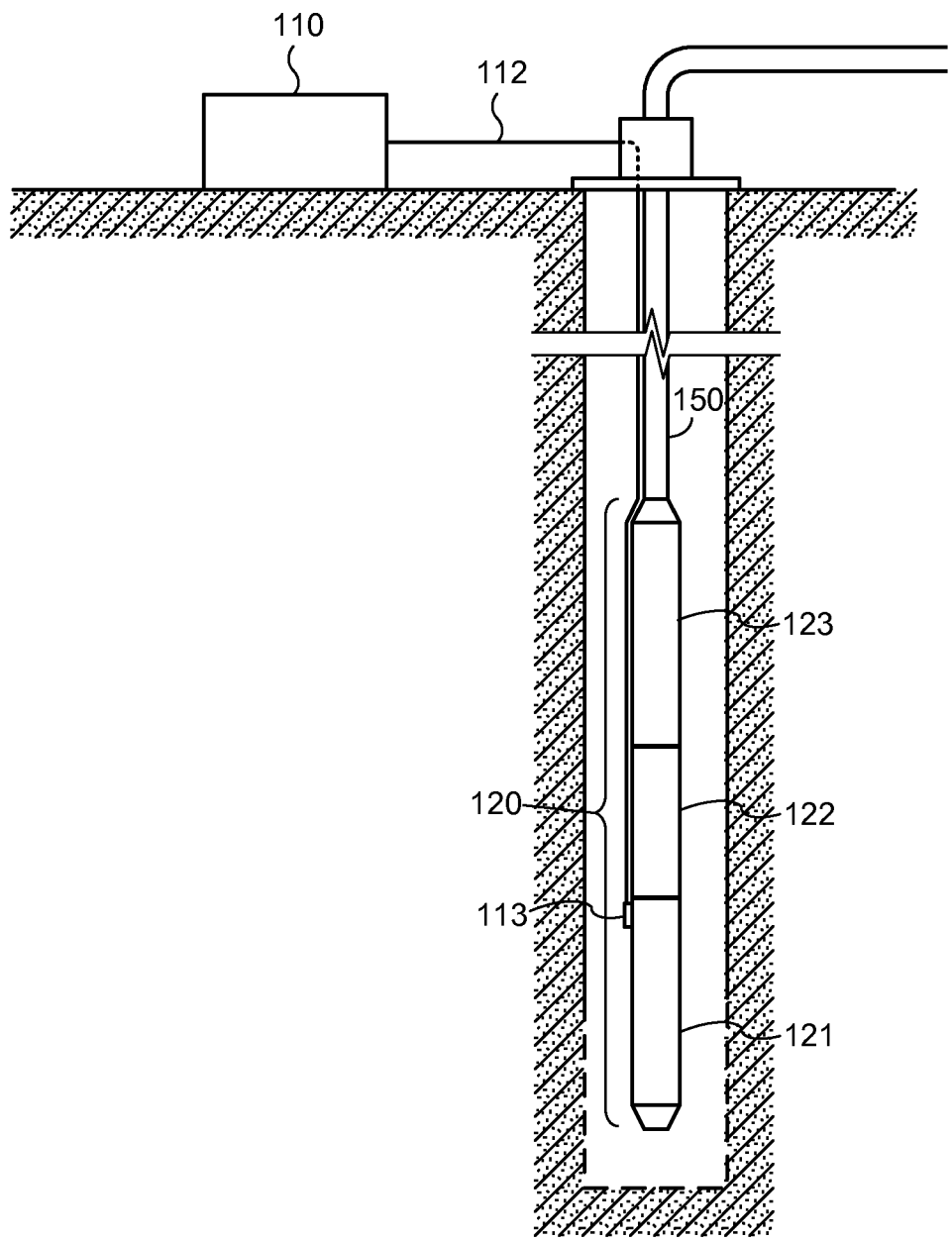
FIG. 1 is a diagram illustrating some of the primary components of an ESP system.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for constructing downhole electric motors in which multiple rotor sections are clocked with respect to each other to counter harmonic feedback and unequal torque contributions by the different rotor sections during operation of the motor. The rotor sections are individually keyed so that they will maintain the proper orientation on the rotor shaft. The keying of each rotor section may be fixed, or it may be adjustable, depending upon the manner in which this feature is implemented.

Before describing the keying of the rotor sections, it may be helpful to review the overall structure of the ESP system. Referring to FIG. 1, a diagram illustrating an exemplary ESP system is shown. In this figure, an ESP system is installed in a well. An ESP 120 is coupled to the end of tubing string 150, and the ESP and tubing string are lowered into the wellbore to position the ESP in a producing portion of the well (as indicated by the dashed lines at the bottom of the wellbore). Surface equipment which includes a drive system 110 is positioned at the surface of the well. Drive system 110 is coupled to ESP 120 by power cable 112, which runs down the wellbore along tubing string 150. Tubing string 150 and power cable 112 may range from less than one thousand feet in a shallow well, to many thousands of feet in a deeper well.

In this embodiment, ESP 120 includes a motor section 121, seal section 122, and pump section 123. ESP 120 may include various other components which will not be described in detail here because they are well known in the art and are not important to a discussion of the invention. Motor section 121 is operated to drive pump section 123, thereby pumping the oil or other fluid through the tubing string and out of the well. Drive system 110 produces power (e.g., three-phase AC power) that is suitable to drive motor section 121. This output power is provided to motor section 121 via power cable 112.

Figure 2:
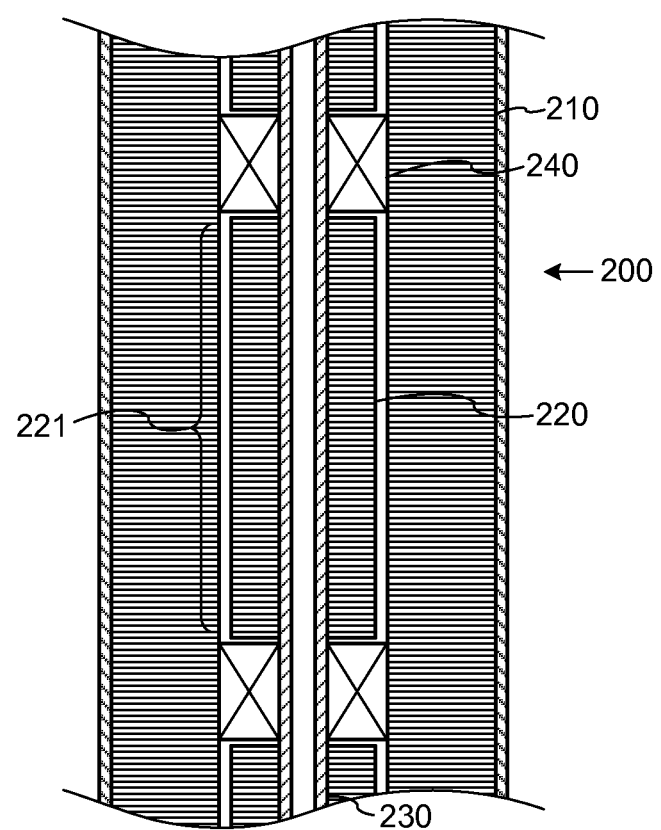
FIG. 2 is a diagram illustrating an exemplary structure of a motor suitable for use in an ESP system as shown in FIG. 1.

Referring to FIG. 2, a diagram illustrating the structure of an exemplary structure of motor 121 is shown. As depicted in this figure, motor 121 has a stator 210 and a rotor 220. Stator 210 is generally cylindrical, with a coaxial bore that runs through it. Rotor 220 is coaxially positioned within the bore of stator 210. Rotor 220 actually includes multiple rotor sections (e.g., 221), each of which is attached to a shaft 230 that is coaxial with the rotor and stator 210. Bearings (e.g., 240) are positioned at the ends of each rotor section. The bearings support shaft 230, and consequently rotor 220, within the bore of stator 210 and allow the rotor and shaft to rotate within the stator.

Figure 3:
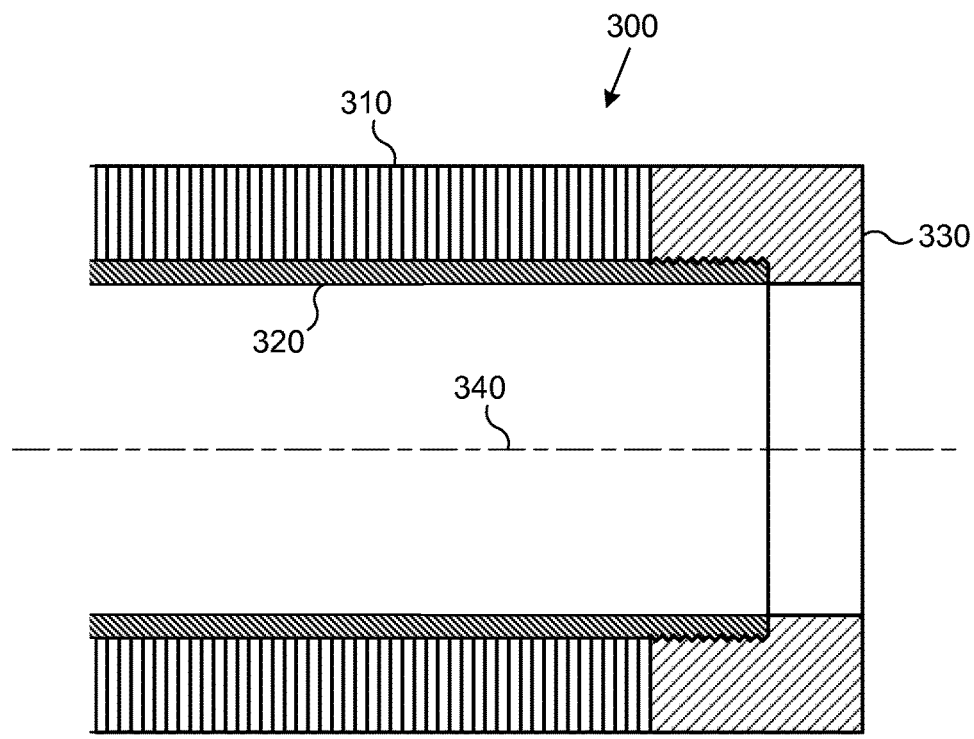
FIG. 3 is a diagram illustrating the structure of an exemplary rotor section in accordance with one embodiment.

Referring to FIG. 3, the structure of an exemplary rotor section in accordance with one embodiment is shown. In this embodiment, rotor section 300 has a set of generally annular laminations (e.g., 310) that are stacked together to form a generally cylindrical rotor body that has a bore through its center. The stack of rotor laminations is positioned on a rotor tube 320 so that the rotor tube is within the bore formed by the lamination stack. An end ring (e.g., 330) is positioned at each end of the lamination stack and secured to the rotor tube to hold the laminations in place. In this embodiment, rotor tube 320 and end rings 330 are threaded so that the end rings can be screwed onto the ends of the rotor tube.

The laminations of the rotor section may have openings therein (between the inner and outer diameters), such that when the laminations are stacked together, cavities are formed in the rotor body to accommodate a set of permanent magnets. The rotor sections may alternatively be designed to use surface magnets. In one embodiment, the magnets form four axially aligned rows. For the purposes of this disclosure, "axial", "axially" and the like refer to directions that are parallel to the axis (340) of the rotor. Each of the magnets in a particular row has the same circumferential position. "Circumferential" and similar terms are used herein to refer to the direction around the circumference of the end ring. The positions of the four rows are depicted by dashed lines 410-413 in FIG. 4. The arrangement of the permanent magnets may vary from one embodiment to another.

Figure 4:
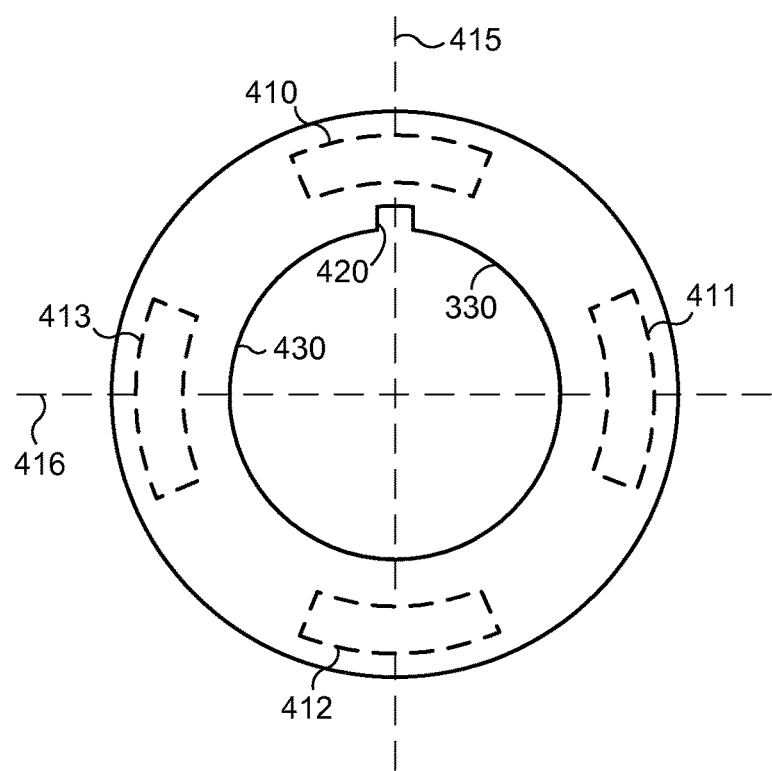
FIG. 4 is a diagram illustrating a view of an end ring in one embodiment, showing the positioning of a slot in relation to rows of permanent magnets in a rotor.

Referring to FIG. 4, a diagram illustrating an end view of end ring 330 is shown. In one embodiment, after the laminations are positioned on the rotor tube and the end rings are secured to the rotor tube, a slot 420 is machined into the inner diameter 430 of each end ring. Slot 420 is formed at a specific circumferential position with respect to the rows of permanent magnets (410-413) and the lines of orientation (415-416) of the rows of magnets. The orientation of the rows of magnets is identified by "witness" marks on the lamination stack. Slots may be formed at the same position in both end rings of the rotor section (on the upper end of vertical line 415 in this example). One or more slots are also provided in the rotor shaft (not shown in the figure). Conventionally, the slots in the rotor shaft will extend axially along the shaft at a single circumferential position. When the rotor section is mounted on the rotor shaft, the slots of the rotor section and shaft are aligned, and a key is inserted in the slots to maintain alignment of the slots between the rotor section and shaft. In this manner, each rotor section is keyed to the rotor shaft.

It should be noted that, for purposes of simplicity and clarity, the examples provided herein use only a single slot in each end ring which is keyed to a corresponding slot in the rotor shaft. Additional slots may be provided in each end ring and in the rotor shaft so that the rotor section can be coupled to the shaft by multiple (two or more) keys. It should also be noted that each rotor section may be keyed to the rotor shaft at only one end of the rotor section, or at both ends of the rotor section.

Figure 5:
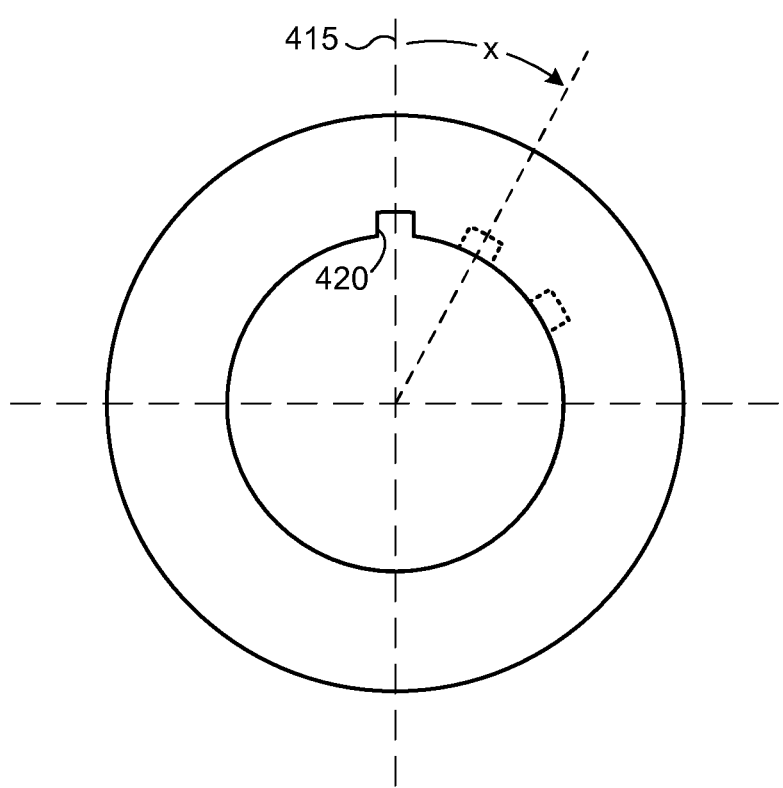
FIG. 5 is a diagram illustrating the alignment of slots in successive rotor sections in one embodiment.

Referring to FIG. 5, a diagram illustrating the alignment of the slots in successive rotor sections is shown. In this figure, a first end ring corresponding to a first rotor section is depicted using solid lines. The end rings for this rotor section have slots (e.g., 420) machined at the upper end of vertical line 415. The next rotor section may have slot (e.g., 421) machined at a position that is clocked, or skewed, by some angle, x, from vertical line 415. The next rotor section may have slots (e.g., 422) that are machined at a position which is skewed by an angle, 2x, from vertical line 415. Additional rotor sections could have slots machined at angles of 3x, 4x, and so on. The slots of the different rotor sections are skewed while the rows of magnets are aligned. Although the successive rotor sections are clocked at regularly incremented angles in this example to account for torsional flexibility of the shaft, the clocking of the rotors may be more irregular (e.g., it may use a pattern of alternating angles) to counter harmonic feedback, or it may use a combination of these patterns to counter both of these problems.

When the rotor sections illustrated in FIG. 5 are mounted on a rotor shaft, the slots (420-421) of the end rings are aligned with each other and with a slot (or a plurality of axially aligned slots) in the rotor shaft. A key is inserted in the slot at one end of each rotor to maintain the alignment of the slots on the rotor sections and shaft. Since the slots are aligned, the rows of magnets in the successive rotor sections are skewed. In this example, the rows of magnets in the first rotor section would be aligned with the slot of the rotor shaft, while the rows of magnets in the second rotor section would be skewed from the rotor shaft slot by x, and the rows of magnets in the third rotor section would be skewed from the rotor shaft slot by 2x.

It should be noted that the successive rotors in this example are incrementally skewed when the rotor is at rest. When the rotor is installed in the stator and the motor is operated, the torsional deflection of the rotor shaft will cause the rotor sections to move toward alignment. In other words, the rotor shaft will twist and, because the end rings on the successive rotors are initially incrementally skewed in the direction opposite this twisting, the rotor sections (and the rows of magnets therein) will become substantially aligned. Further, because the rotor sections twist the rotor shaft, they will provide an increased torque contribution, as compared to a configuration in which the rotor sections are aligned when the rotor shaft is at rest. The incremental angle by which each rotor section is skewed may be selected so that the torque contribution of each rotor section is substantially equal.

In the example of FIG. 5, each successive rotor section is skewed by the same angle from the adjacent rotor section. As noted above, this clocking of the rotor sections is intended to account for the torsional flexibility of the rotor shaft and the resulting unequal torque contributions of the different rotor sections when the motor is in operation and under load. In other embodiments, the clocking of the successive rotor sections could follow a different pattern. For example, in one embodiment, the second rotor section could be skewed from the first rotor section by an angle, x, while the next rotor section might be skewed by an angle of −x. In other words, the rotor sections would be clocked alternately at 0 or x. In this case, odd numbered rotor sections (e.g., third, fifth, etc.) would be aligned with the first rotor section, while even numbered rotor sections (e.g., second, fourth, etc.) would be aligned with each other, but skewed from the first rotor section by the angle, x. Other embodiments could have combinations of the clocking patterns described above, or entirely different patterns.

In the embodiment of FIGS. 3 and 4, the slots (e.g., 420) of the rotor sections are machined into the end rings (e.g., 330), so the clocking of each rotor section is permanent (except that the rotor section can be disassembled, and reassembled with new end rings that can have slots machined in new locations). If it is preferred that the clocking of the rotor sections is adjustable, end rings having an alternate configuration can be used. An exemplary configuration is illustrated in FIGS. 6 and 7.

Figure 6:
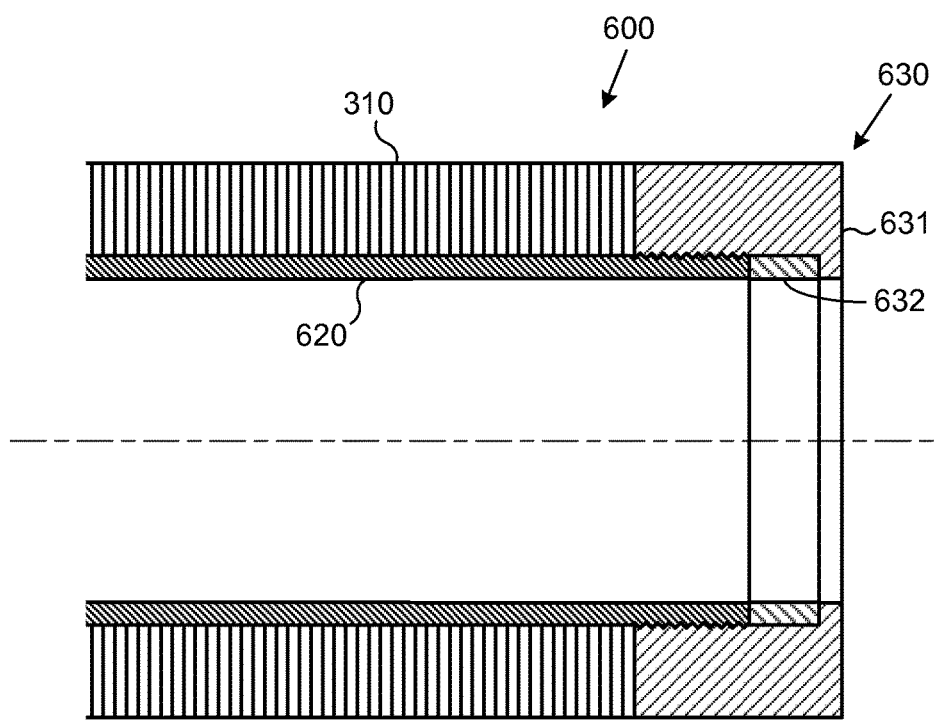
FIGS. 6 and 7 are diagrams illustrating an exemplary configuration of a two-piece end ring as used in one embodiment.
Figure 7:
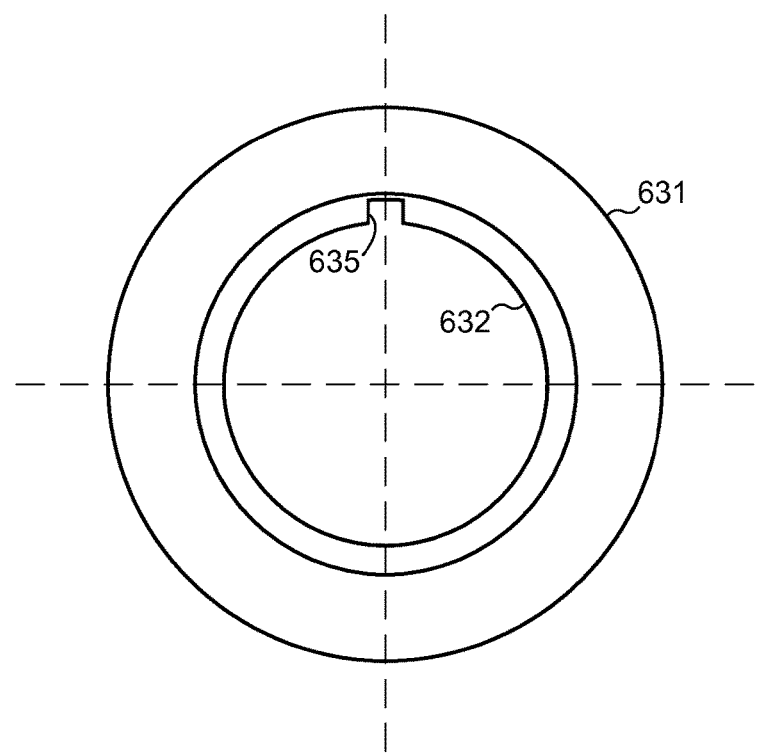

In the embodiment of FIGS. 6 and 7, rotor section 600 has a set of generally annular laminations (e.g., 610) that are stacked together to form a generally cylindrical rotor body that has a bore through its center. The stack of rotor laminations is positioned on a rotor tube 620 (the rotor tube is within the bore formed by the lamination stack). The rotor tube is threaded at each end to accept an end ring having complementary threads. These portions of the structure are the same as the embodiment of FIGS. 3 and 4.

The embodiment of FIGS. 6 and 7 differs from the previous embodiment in that a two-piece end ring 630 is used instead of a one-piece end ring. In this embodiment, end ring 630 includes an outer retaining ring 631 and an inner slotted ring 632. Inner ring 632 fits concentrically within outer ring 631. Prior to installation on rotor tube 620, inner ring 632 can rotate within outer ring 631. Inner ring has a slot 635 formed on its inner diameter. As inner ring 632 is rotated within outer ring 631, slot 635 is rotated to different positions with respect to the outer ring.

After the stack of rotor laminations is positioned on the rotor tube, end ring 630 is threaded onto the end of the rotor tube. Before end ring 630 is tightened on the end of the rotor tube, inner ring 632 is rotated to the desired position with respect to the rotor's rows of permanent magnets. The desired position is determined in the same manner as for other embodiments. With the inner ring in the desired position, threaded outer ring 631 is tightened onto rotor tube 620. The contacting faces of rotor tube 620 and inner ring 631 may be gnurled so that, once outer ring 631 is tightened onto the rotor tube, the inner ring does not rotate with respect to the rotor tube.

The embodiment of FIGS. 6 and 7 has several advantages over the embodiment of FIGS. 3 and 4. For instance, if for some reason it becomes desirable to change the clocking of the rotors for a motor, the embodiment of FIGS. 3 and 4 would require that a new slot be machined into the end ring. In the embodiment of FIGS. 6 and 7, the outer ring could be loosened, after which the inner ring could be rotated so that the slot is in the desired position. The outer ring would then be tightened to secure the inner ring and the slot in the new position. The adjustability of the slot position also allows for adjustment of the slot to many different positions without the need for different fixtures which would be required to machine slots in different positions. Further, if the two-piece end rings of FIGS. 6 and 7 are used in a motor, it would be possible for a field service center to disassemble the motor, stock the rotor sections for later use, and then re-clock individual rotor sections if necessary before assembling the rotor sections in a different motor.

In another embodiment, the clocking of the different rotor sections may be achieved through the machining of slots in the rotor shaft. Conventionally, the rotor shaft has one or more slots that are machined into the shaft at a single circumferential position. if there is a single slot in the shaft, it normally extends along a length of the shaft on which multiple rotor sections are installed. In this embodiment of the invention, however, a separate slot is machined in the shaft for each rotor section. Each slot is formed at a circumferential position corresponding to the desired clocking of the rotor section that will be installed on the shaft and keyed to the slot. In this embodiment, each rotor is identically configured (i.e., each has a slot at the same circumferential position). Because each rotor section is keyed to a separate slot in the rotor shaft, each rotor section is skewed circumferentially according to the position of the corresponding rotor shaft slot.

The various embodiments of the invention may have a number of advantages over conventional permanent-magnet rotor designs. As noted above, by skewing rotor sections, harmonic feedback that is produced by the rotor may be reduced. Further, the skewing of the rotor sections at rest may counter torsional deflection, causing the rotor sections to become aligned when the motor is in operation. Still further, by varying the position of the slots machined in the different rotor sections, rather than using different lamination configurations to shift the rows of magnets within the rotors, the number of lamination configurations is reduced, thereby reducing manufacturing costs. Still other advantages may be apparent to those of skill in the field of the invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:
1. A system comprising:
an electric drive;
an electric submersible pump system (ESP); and
a power cable coupled between the drive and the ESP, wherein the power cable carries power from the drive to the ESP;
wherein the ESP includes a pump, and a motor coupled to the pump, wherein the motor drives the pump, the motor having a stator and at least two permanent-magnet rotor sections;
wherein within each of the rotor sections, a plurality of permanent magnets are positioned in two or more rows, wherein each row is axially aligned;
wherein the rotor sections are mounted on a common rotor shaft, wherein each rotor section is configured to be secured to the rotor shaft at a circumferential angle which is variable;
wherein each rotor section is adjusted so that adjacent ones of the rotor sections are clocked with respect to each other and the rows of permanent magnets within a first one of the rotor sections are circumferentially displaced from corresponding rows of permanent magnets within a second, adjacent one of the rotor sections by a desired, adjustable angle.

2. The system of claim 1, wherein for each pair of adjacent rotor sections, at least one end of each rotor section is adjustably keyed to the rotor shaft, wherein the keying of the rotor section is adjusted to the predetermined displacement angle between the rotor sections.

3. The system of claim 1, wherein each rotor sections has a pair of end rings, wherein the end rings are secured to opposing ends of the rotor section, thereby securing a set of rotor laminations and the plurality of permanent magnets between the end rings.

4. The system of claim 3, wherein each end ring is keyed to mate with a shaft slot in a common rotor shaft and thereby maintain the desired, adjustable angular displacement of the rotor section with respect to the adjacent rotor section.

5. The system of claim 4, wherein the shaft slot comprises one or more shaft slots at a single circumferential position on the rotor shaft.

6. The system of claim 4, wherein the shaft slot comprises one of a plurality of shaft slots, wherein ones of the shaft slots that correspond to adjacent ones of the rotor sections are circumferentially displaced on the rotor shaft.

7. The system of claim 1, wherein the motor includes at least three rotor sections, wherein the angular displacement between each adjacent pair of rotor sections is the same.

8. The system of claim 1, wherein the motor includes at least three rotor sections, wherein the angular displacement is not the same between each adjacent pair of rotor sections.

9. A system comprising:
an electric drive;
an electric submersible pump system (ESP); and
a power cable coupled between the drive and the ESP, wherein the power cable carries power from the drive to the ESP;
wherein the ESP includes a pump, and a motor coupled to the pump, wherein the motor drives the pump, the motor having a stator and at least two permanent-magnet rotor sections;
wherein within each of the rotor sections, a plurality of permanent magnets are positioned in two or more rows, wherein each row is axially aligned;
wherein adjacent ones of the rotor sections are clocked with respect to each other so that the rows of permanent magnets within a first one of the rotor sections are circumferentially displaced from corresponding rows of permanent magnets within a second, adjacent one of the rotor sections by a predetermined angle;
wherein each rotor sections has a pair of end rings, wherein the end rings are secured to opposing ends of the rotor section, thereby securing a set of rotor laminations and the plurality of permanent magnets between the end rings;

wherein each end ring is keyed to mate with a shaft slot in a common rotor shaft and thereby maintain the predetermined angular displacement of the rotor section with respect to the adjacent rotor section;

wherein each end ring is threaded onto a rotor tube, thereby securing the rotor laminations and the plurality of permanent magnets between the end rings, wherein each end ring has an end ring slot at a predetermined position, wherein the end ring slot receives a key that holds the rotor in a predetermined angular position with respect to the rotor shaft and the adjacent rotor section.

10. The system of claim 9, wherein each end ring comprises a single-piece ring in which the end ring slot is formed in the single-piece ring at a fixed position.

11. The system of claim 9, wherein each end ring comprises a threaded outer ring and an inner ring that is rotatable with respect to the outer ring, wherein the inner ring has the end ring slot formed therein, wherein the inner ring is rotated to a desired position and the outer ring is secured to the rotor tube, thereby securing the inner ring in the desired position and securing the end ring slot in the desired position.

12. A downhole electric motor comprising:
a stator and a rotor concentrically positioned within a bore of the stator
wherein the rotor has at least two permanent-magnet rotor sections mounted on a common rotor shaft, wherein each rotor section is configured to be secured to the rotor shaft at a circumferential angle which is variable;
wherein within each of the rotor sections, a plurality of permanent magnets are positioned in two or more rows, wherein each row is axially aligned;
wherein each rotor section is adjusted so that adjacent ones of the rotor sections are clocked with respect to each other and the rows of permanent magnets within a first one of the rotor sections are circumferentially displaced from corresponding rows of permanent magnets within a second, adjacent one of the rotor sections by a desired, adjustable angle;
wherein for each pair of adjacent rotor sections, at least one end of each rotor section is adjustably keyed to the rotor shaft to maintain the desired, adjustable displacement angle between the rotor sections; and
wherein each rotor sections has a pair of end rings, wherein the end rings are secured to opposing ends of the rotor section, thereby securing a set of rotor laminations and the plurality of permanent magnets between the end rings.

13. The downhole electric motor of claim 12, wherein each end ring is keyed to mate with a shaft slot in the common rotor shaft and thereby maintain the predetermined angular displacement of the rotor section with respect to the adjacent rotor section.

14. The downhole electric motor of claim 13, wherein the shaft slot comprises one or more shaft slots at a single circumferential position on the rotor shaft.

15. The downhole electric motor of claim 13, wherein the shaft slot comprises one of a plurality of shaft slots, wherein ones of the shaft slots that correspond to adjacent ones of the rotor sections are circumferentially displaced on the rotor shaft.

16. The downhole electric motor of claim 12, wherein the motor includes at least three rotor sections, wherein the angular displacement between each adjacent pair of rotor sections is the same.

17. The downhole electric motor of claim 12, wherein the motor includes at least three rotor sections, wherein the angular displacement is not the same between each adjacent pair of rotor sections.

18. A downhole electric motor comprising:
a stator and a rotor concentrically positioned within a bore of the stator
wherein the rotor has at least two permanent-magnet rotor sections mounted on a common rotor shaft;
wherein within each of the rotor sections, a plurality of permanent magnets are positioned in two or more rows, wherein each row is axially aligned;
wherein adjacent ones of the rotor sections are clocked with respect to each other so that the rows of permanent magnets within a first one of the rotor sections are circumferentially displaced from corresponding rows of permanent magnets within a second, adjacent one of the rotor sections by a predetermined angle;
wherein for each pair of adjacent rotor sections, at least one end of each rotor section is keyed to the rotor shaft to maintain the predetermined displacement angle between the rotor sections; and
wherein each rotor sections has a pair of end rings, wherein the end rings are secured to opposing ends of the rotor section, thereby securing a set of rotor laminations and the plurality of permanent magnets between the end rings;
wherein each end ring is keyed to mate with a shaft slot in the common rotor shaft and thereby maintain the predetermined angular displacement of the rotor section with respect to the adjacent rotor section;
wherein each end ring is threaded onto a rotor tube, thereby securing the rotor laminations and the plurality of permanent magnets between the end rings, wherein each end ring has an end ring slot at a predetermined position, wherein the end ring slot receives a key that holds the rotor in a predetermined angular position with respect to the rotor shaft and the adjacent rotor section.

19. The downhole electric motor of claim 18, wherein each end ring comprises a single-piece ring in which the end ring slot is formed in the single-piece ring at a fixed position.

20. The downhole electric motor of claim 18, wherein each end ring comprises a threaded outer ring and an inner ring that is rotatable with respect to the outer ring, wherein the inner ring has the end ring slot formed therein, wherein the inner ring is rotated to a desired position and the outer ring is secured to the rotor tube, thereby securing the inner ring in the desired position and securing the end ring slot in the desired position.

* * * * *